United States Patent [19]

Neuwirth et al.

[11] Patent Number: 5,008,772
[45] Date of Patent: Apr. 16, 1991

[54] TELEPHONE CIRCUIT PROTECTOR MODULE HAVING PLURAL CIRCUIT GROUNDING MEANS

[75] Inventors: Helmuth Neuwirth, Garden City; Carl Meyerhoefer, Dix Hills; William V. Carney, Oyster Bay; Peter L. Visconti, Baldwin, all of N.Y.

[73] Assignee: Porta Systems Corp., Syosset, N.Y.

[21] Appl. No.: 587,072

[22] Filed: Sep. 24, 1990

[51] Int. Cl.$^5$ .............................................. H02H 3/22
[52] U.S. Cl. ................................... 361/119; 361/120; 361/124; 337/32
[58] Field of Search ....................... 361/119, 120, 124; 337/32

[56] References Cited

U.S. PATENT DOCUMENTS

| | | | |
|---|---|---|---|
| 4,729,053 | 3/1988 | Dorival et al. | 361/119 |
| 4,730,229 | 3/1988 | DeLuca et al. | 361/119 |
| 4,876,621 | 6/1989 | Rust et al. | 361/58 |
| 4,958,254 | 9/1990 | Kidd et al. | 361/58 |

Primary Examiner—Todd E. DeBoer
Attorney, Agent, or Firm—Charles E. Temko

[57] ABSTRACT

An improved telephone subscriber circuit protector module providing plural surge voltage and excess current protection elements including so-called sneak current protection. The module includes a three-element gas tube which protects against voltage surges in the range of 200 to 300 volts, and includes fail safe protection relative to the gas tube should the gas tube become non-conductive over its intended range of protection. The fail safe protection is thermally operated under the influence of high current. Secondary air gap protection supplements the operation of the gas tube in the event of gas tube failure, and is operative to ground momentary voltage surges in the area of 1500 volts. Separate sneak current protection employing heat coils are operative in a range below one ampere flow, and an alternate form provides for the opening of the subscriber side of the line rather than the grounding of it. All of the protective elements communicate with a common ground plane forming part of a ground assembly.

3 Claims, 2 Drawing Sheets

TELEPHONE CIRCUIT PROTECTOR MODULE HAVING PLURAL CIRCUIT GROUNDING MEANS

RELATED INVENTION

Reference is made to copending application Ser. No. 478,424 filed Feb. 12, 1990 entitled Gas Tube Fail Safe Device which discloses and claims a related invention, said application having been assigned to the same assignee as the assignee of the present application.

BACKGROUND OF THE INVENTION

This invention relates generally to the field of telephony, and more particularly to an improved form of secondary or backup protection for individual subscriber pair protector modules normally installed upon a main frame in a telephone office.

Such protector modules traditionally employ a pair of carbon electrodes which arc upon the occurrence of momentary excess voltage overloads to ground the individual circuit. Later developments include heat-sensitive devices employing a fusible solder member which, upon fusing, allows a resilient member to permanently short the module to ground.

A still later development, now in widespread use, is the so-called three-element gas tube in which momentary voltage surges cause the tube to become conductive to short the surge to ground, and in which, upon the occurrence of a sustained current overload, the tube develops sufficient heat to activate a separate heat-sensitive device to cause permanent shorting to ground.

With the development of requirements for protector modules of ever smaller dimensions consistent with connector blocks having ever higher circuit densities, the use of conventional heat sensitive devices becomes more difficult because of space limitations, and it has become necessary to provide a heat-sensitive element of sufficiently simple construction to supplement the action of the three-element gas tube without requiring significant additional volume within the protector module housing. Further, in some cases, there is a requirement for secondary air gap protection which will provide protection against momentary overloads in the event of a defective gas tube in which the conductivity voltage levels are other than standard, apart from the function of the heat-sensitive element.

In the above-identified copending application, there is disclosed a construction which accommodates these requirements. This construction is of substantial utility, and has found significant acceptance in the industry. Its principal shortcoming lies in the fact that gas tube protection is normally operative in voltage ranges which are far above those occurring in the case of so-called sneak currents which are commonly present in buildings in which the modules are installed. Such currents are often of unknown origin, and normally range in voltage between a few volts and 200 volts, although they can occur at voltages of greater value. Most of such currents are transitory in nature, but they are capable of damaging solid-state equipment connected to the subscriber side of the line. It is known to employ diodes in parallel with other protective elements for dealing with such sneak currents, and the use of specialized heat coils for this purpose is not unknown. Where a large number of individual protector elements are employed in a single module with parallel interconnections, there has arisen the problem of connection of such protective elements to a common ground in a manner which will not complicate manufacture and assembly of the module. This aspect of construction becomes increasingly important when it is realized that much of the assembly work is often performed by relatively unskilled labor.

SUMMARY OF THE INVENTION

Briefly stated, the invention contemplates the provision of an improved subscriber circuit module of the class described in which provision is made for four individual protector elements all communicating with a common grounding element having a transversely extending ground plane in such manner that each protector element may function independently of the others. A first protective element comprises a standard three-element gas tube. A second protector element comprises a fused metallic clip providing heat-sensitive protection against gas tube failure, and operative upon the occurrence of sustained current overloads. Immediately adjacent the fail safe device is secondary air gap means which communicates with the ground plane through the fail safe element. Finally, sneak currents are accommodated by specialized heat coils which actuate in approximately 200 seconds from a sustained current of as little as one-half ampere. In an alternate form, the heat coil/cricket opens the subscriber side of the line, rather than grounds the subscriber side of the line. Because of the configuration of the respective protector elements, assembly of the device comprises simply dropping the parts into an open-ended housing in prescribed order, and closing and sealing the module.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 2:
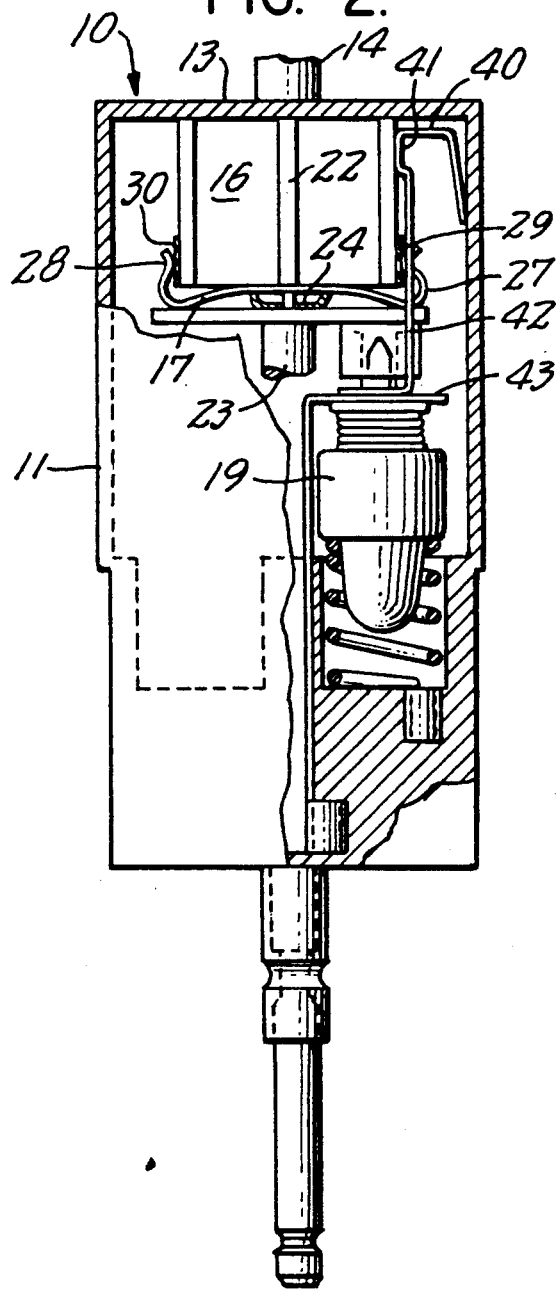
FIG. 2 is a fragmentary top plan view of the embodiment, partly broken away in section.
Figure 3:
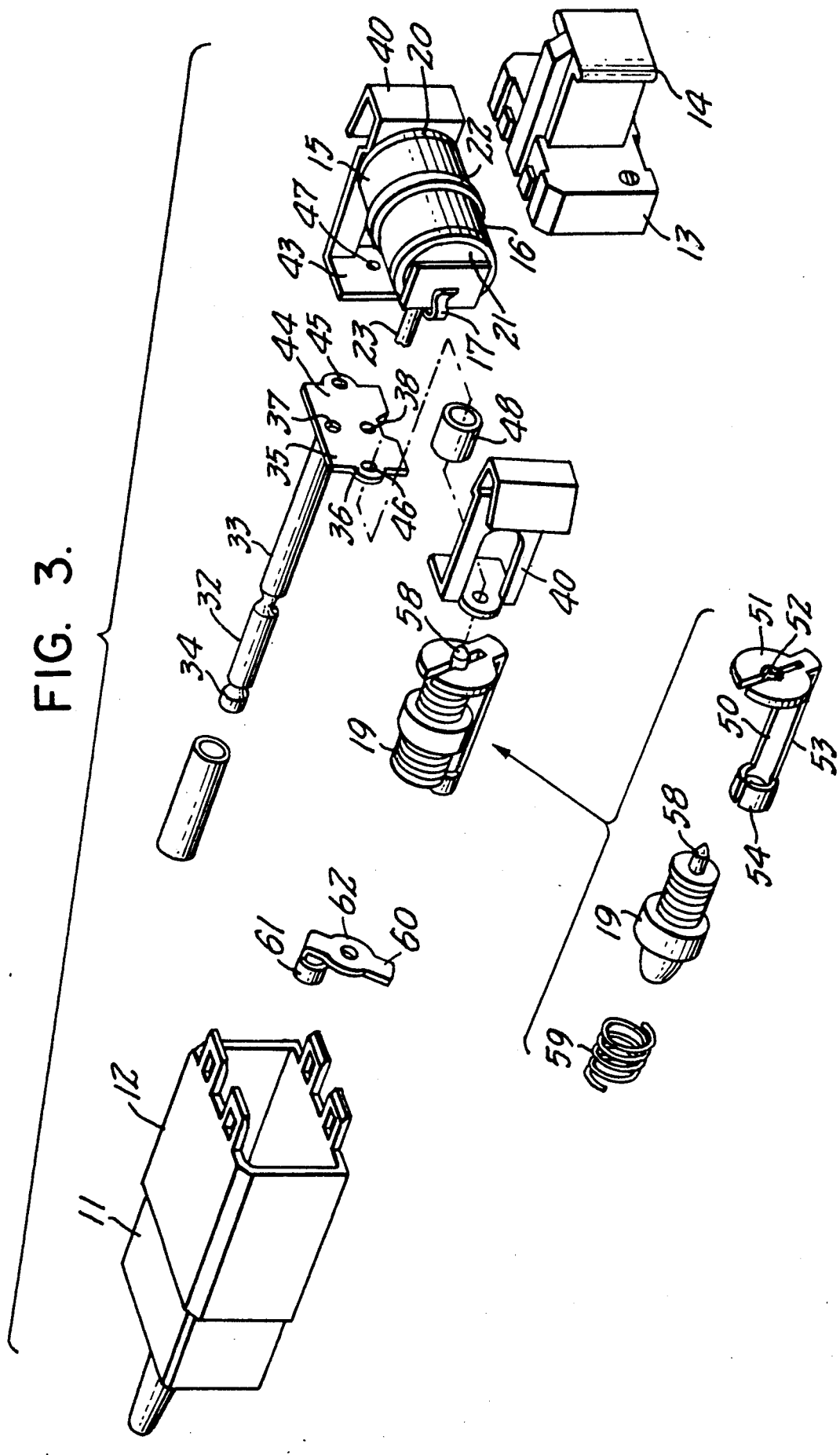
FIG. 3 is an exploded view in perspective of the embodiment.

Referring to FIGS. 2 and 3 in the drawing, the device, generally indicated by reference character 10 includes a housing element 11 of known type comprising a hollow main body member 12 and a plug type end cap 13 having a manually engageable handle member 14 to facilitate engagement and disconnection with a connector block (not shown).

A first protection element includes a three-element gas tube assembly 15 disclosed in the above-mentioned copending application. The assembly includes the gas tube 16 and a resilient metallic fail safe clip 17. A third protection element includes a secondary air gap element 18, the details of elements 16–18, inclusive, being set forth in the above-mentioned copending application. A fourth protection element includes a pair of heat coils, one of which is indicated by reference character 19.

The gas tube 16 is generally conventional in construction and operation, and includes end electrodes 20 and 21. The center electrode 22 includes a laterally extending contact pin 23 which penetrates a corresponding opening in a transverse member 24 of the clip 17.

The clip 17 also includes end terminals 27 and 28 which contact the end electrodes 20 and 21 but are separated from electrical communication by planar fusible insulators 29 and 30. Fusing normally occurs upon the presence of sustained current overloads.

A ground assembly 32 (FIG. 3) includes a ground pin 33 having an outer terminal 34 and an inner terminal 35 which supports a ground plane member 36. A first orifice 37 is secured by heading over the inner terminal 35. A second orifice 38 engages the pin 23 upon assembly. It will be observed that this contact establishes ground for both the gas tube and the clip.

Referring to FIGS. 2 and 3, a pair of test point contacts, one of which is indicated by reference character 40, includes an inner end contact 41 which contacts a respective end electrode 20-2, a generally longitudinally extending segment 42, and a transversely extending inner end 43 which contacts a surface 44 of the ground plane member 36. Member 36 also includes third and fourth orifices 45 and 46 each of which aligns with an orifice 47 in a respective end 43. A pair of cylindrically shaped insulative members 48 separate the ground plane member 36 and the transversely extending end 43, while providing a channel for the projectable pin on a heat coil 19.

A pair of long contacts, one of which is indicated by reference character 50 are generally conventional, and include an inner transverse end contact 51 wich engages end 43 having a slotted opening 52 which aligns with orifices 46 and 47. The inner end connects through an elongated shank 53 with an outer pin engaging terminal 54.

The heat coils 19 are positioned within a respective long contact as best seen in FIG. 3 and are generally conventional, including an extensible tip 58 which grounds against member 36 upon actuation under the influence of spring 59. Short contacts, one of which is indicated by reference character 60, are also generally conventional, including an outer pin engaging contact 61 and a transverse member 62 which contacts the outer end of the spring 59.

Figure 4:
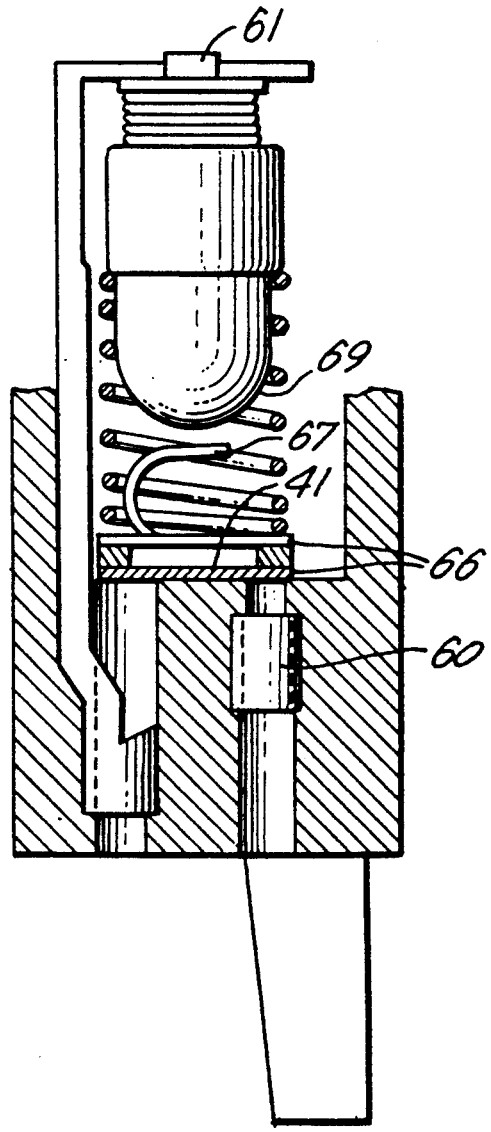
FIG. 4 is an enlarged fragmentary sectional view showing an alternate form of heat coil.

In the alternate construction shown in FIG. 4, the details of the heat coil interconnection are as disclosed in the Fasano Pat. No. 4,318,153 also assigned to the same assignee as the instant application. In this construction, the short contact engages an insulative member 66 which cooperates with a separate resilient member 67 which normally interconnects the short contact with an end 69 of the heat coil housing. The pin contact 61 is eliminated or shortened, so that upon actuation of the heat coil, there is no electrical communication between the short contact 60 and the housing of the heat coil, thus effectively opening the subscriber side of the line.

Figure 1:
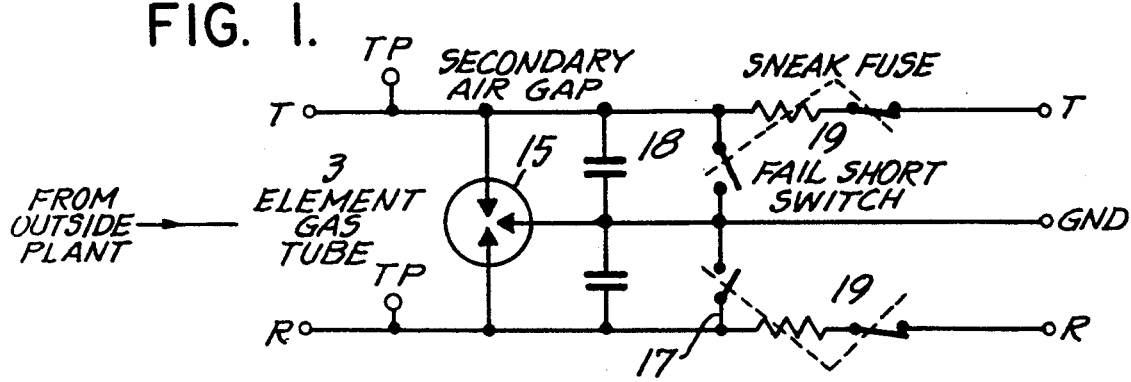
FIG. 1 is a schematic wiring diagram of a preferred embodiment of the invention.

Thus, as best appreciated from a consideration of FIG. 1, four separate protection elements independently effect a grounding function of the line to a common ground assembly, and are conveniently so interconnected during simple drop-in assembly of the component parts within the housing. A failure of any of the four protective elements will not prevent application of the remaining three, and all four protector elements require only the space normally available in a conventionally sized housing. By avoiding use of diode circuits, the manufacturing and assembly cost of the device is maintained at a reasonable order, and assembly may be performed by those having only ordinary skills.

We wish it to be understood that we do not consider the invention to be limited to the precise details of structure shown and set forth in this specification, for obvious modifications will occur to those skilled in the art to which the invention pertains.

We claim:

1. In a subscriber circuit telephone protector module including a housing, excess voltage and current protector means disposed within said housing for grounding currents having voltage and current flow above predetermined levels, the improvement comprising: said excess voltage means including a three-element gas tube having a central electrode and first and second end electrodes, a gas tube fail safe device including an elongated metallic clip contacting said center electrode and maintained in insulated relation relative to said end electrodes by fusible members; a ground assembly including an elongated ground pin extending outwardly of said housing and having an inner end terminal, a transversely extending ground plane member carried by said inner end; said center electrode having a laterally extending contact pin penetrating said ground plane member for electrical communication therewith, said elongated clip being carried by said contact pin; a pair of test point contacts each contacting a respective end electrode independently of said fusible means at a first end thereof, and having a transversely extending second end overlying said ground plane member, cylindrical insulator means spacing said second end from said ground plane member; a pair of long contacts each having first and second ends, said first end contacting said second end of a respective test point contact wherein corresponding through orifices in each of said test point contact and said long contact are aligned; and a pair of thermally actuated heat coils, each carried by a respective long contact and having extensible point contact means penetrating said aligned orifices to contact said ground plane member upon heat coil actuation; whereby each of said three element gas tube and fail safe device are in constant contact with said ground plane member, and said heat coils are selectively in contact with said ground plane member; said gas tube serving to ground voltage surges in the range of 200 to 300 volts, said fail safe device serving to ground sustained current surges, and said heat coils becoming operative in the presence of sneak currents in the range of under one ampere.

2. The improvement in accordance with claim 1, further comprising secondary air gap means supplementing said fail safe device, and operating in the range of 1500 volts.

3. The improvement in accordance with claim 1, further characterized in said heat coils including means for opening said subscriber circuit on the subscriber side of said protector module.

* * * * *